US010632435B2

(12) United States Patent
Voorhans et al.

(10) Patent No.: US 10,632,435 B2
(45) Date of Patent: Apr. 28, 2020

(54) FLUIDIZED BED GRANULATION

(71) Applicant: YARA INTERNATIONAL ASA, Oslo (NO)

(72) Inventors: Jaap Voorhans, Terneuzen (NL); Luc Vanmarcke, Kaprijke (BE); André Kayaert, Herent (BE)

(73) Assignee: Yara International ASA, Oslo (NO)

( * ) Notice: Subject to any disclaimer, the term of this patent is extended or adjusted under 35 U.S.C. 154(b) by 0 days.

(21) Appl. No.: 16/339,408

(22) PCT Filed: Oct. 27, 2017

(86) PCT No.: PCT/EP2017/077557
§ 371 (c)(1),
(2) Date: Apr. 4, 2019

(87) PCT Pub. No.: WO2018/078074
PCT Pub. Date: May 3, 2018

(65) Prior Publication Data
US 2019/0240631 A1 Aug. 8, 2019

(30) Foreign Application Priority Data
Oct. 27, 2016 (EP) .................................... 16196033

(51) Int. Cl.
*B01J 2/16* (2006.01)
*C05C 1/02* (2006.01)
(Continued)

(52) U.S. Cl.
CPC ................. *B01J 2/16* (2013.01); *B05C 19/02* (2013.01); *B05D 1/24* (2013.01); *C05C 1/02* (2013.01); *C05C 9/005* (2013.01); *C05G 3/0058* (2013.01)

(58) Field of Classification Search
None
See application file for complete search history.

(56) References Cited

U.S. PATENT DOCUMENTS 4,219,589 A * 8/1980 Niks .......................... B01J 2/16
427/213
5,120,345 A * 6/1992 Kayaert ..................... B01J 2/16
71/30
(Continued)

FOREIGN PATENT DOCUMENTS

| DE | 102 60 740 A1 | 7/2004 |
| WO | 02/057005 A1 | 7/2002 |
| WO | 2017147695 A1 | 9/2017 |

OTHER PUBLICATIONS

PCT International Search Report and Written Opinion dated Feb. 6, 2018 in connection with PCT International Patent Application No. PCT/EP2017/077557.
(Continued)

*Primary Examiner* — Mary Lynn F Theisen
(74) *Attorney, Agent, or Firm* — Amster, Rothstein & Ebenstein LLP

(57) ABSTRACT

Method and fluidized bed reactor for the production of granules, such as granules of urea or ammonium nitrate. The fluidized bed reactor comprises at least one granulation compartment with air inlets, and an air moving device downstream of the granulation compartment, e.g., downstream of at least one scrubbers. The air moving device is configured to draw air through said at least one air inlet into at least one granulation compartment.

19 Claims, 2 Drawing Sheets

(51) Int. Cl.
*C05C 9/00* (2006.01)
*C05G 3/00* (2020.01)
*B05C 19/02* (2006.01)
*B05D 1/24* (2006.01)

(56) References Cited

U.S. PATENT DOCUMENTS

| | | | |
|---|---|---|---|
| 5,779,945 A * | 7/1998 | Nijsten | B01J 2/00 23/313 FB |
| 2004/0088830 A1 | 5/2004 | Mennen | |
| 2006/0228281 A1 | 10/2006 | Stroder et al. | |
| 2011/0229394 A1 * | 9/2011 | Niehues | C05C 3/005 423/238 |
| 2015/0217221 A1 * | 8/2015 | Wang | B01D 47/06 95/199 |
| 2016/0115089 A1 | 4/2016 | Wei et al. | |

OTHER PUBLICATIONS

PCT International Preliminary Report on Patentability dated Dec. 19, 2018 in connection with PCT International Patent Application No. PCT/EP2017/077557.
PCT Written Opinion of the International Preliminary Examining Authority dated Sep. 18, 2018 in connection with PCT International Patent Application No. PCT/EP2017/077557.
Communication Under Rule 71(3) EPC dated Mar. 11, 2020 from EP Application No. 17800715.9.

* cited by examiner

FLUIDIZED BED GRANULATION

CROSS-REFERENCE TO RELATED APPLICATIONS

This application is a U.S. national stage entry under 35 U.S.C. § 371 of PCT International Patent Application No. PCT/EP2017/077557, filed Oct. 27, 2017, which claims priority to European Patent Application No. 16196033.1, filed Oct. 27, 2016, the contents of which are incorporated herein by reference in their entirety.

FIELD OF THE INVENTION

This invention relates to a fluidized bed reactor, as well as to a method for the production of granules, such as urea or ammonium nitrate-based granules, typically used as a fertilizer material, using such a fluidized bed reactor.

BACKGROUND

The discussion below is merely provided for general technological background information and is not intended to be used as an aid in determining the scope of the claimed subject matter.

To produce granules of a liquid solution or melt, such as an aqueous or non-aqueous ammonium nitrate or urea solution, said solution or melt is sprayed into a granulation compartment containing a fluidized bed of solid nuclei. The fluidized bed is fluidized by introducing a fluidization gas, usually air, through the bed of nuclei. The nuclei grow by accretion, i.e. solidification and crystallization of the sprayed urea liquid on them, to form granules of a desired average size, which are subsequently withdrawn from the fluidized bed reactor, also called a granulation reactor or granulator, wordings which are used interchangeably in this patent document.

The fluidization air is generally blown into the granulation compartments by means of blowers. In a subsequent compartment, the air is stripped from fine solid material, e.g., in a scrubber, a cyclone or a similar separator. The air is usually removed from the granulation reactor by means of an exhaust fan.

An example of such reactor for the production of urea granules is disclosed in U.S. Pat. No. 3,533,829 (Azote et Produits Chimiques S.A., 1970), which discloses a fluidized bed reactor comprising at least one granulation compartment with at least one air inlet and which comprises two air moving devices: (i) a blower upstream of the fluidized bed configured to push fluidizing air through said at least one air inlet into the granulation compartment, and (ii) an exhaust fan, downstream of the granulation compartment, but not configured to draw air through the at least one air inlet into the granulation compartment; the exhaust fan merely serves the exhaustion of air leaving the system.

Also GB2046121 (MTA Müszaki Kémiai, 1980) discloses a fluidized bed reactor comprising at least one granulation compartment with at least one air inlet and which comprises two air moving devices: (i) a blower upstream of the fluidized bed configured to push fluidizing air through said at least one air inlet into the granulation compartment, and (ii) an exhaust fan, downstream of the granulation compartment, configured to remove air leaving the system, but not configured to draw air through the at least one air inlet into the granulation compartment; the exhaust fan merely serves the exhaustion of air leaving the wet scrubber, which is positioned after the fluidized bed reactor.

The produced granules are generally moved from the granulation compartment to an after-cooler, which can be integrated with the fluidized bed reactor. In the after-cooler, further dust is produced. Therefore, also air from the after-cooler is usually first treated in a scrubber before it can be vented.

To avoid leakage of air from the reactor, a slight under-pressure, typically of about 0.1 to 10 mbar, preferably about 0.1 to 7 mbar, is created in the fluidized bed reactor compartment and/or after-cooler, as for example is disclosed in U.S. Pat. No. 5,779,945 (DSM N.V., 1998) and EP 2253374 A1 (Stamicarbon, 2010).

SUMMARY OF THE INVENTION

It is an object of the invention to improve process efficiency while reducing energy consumption.

The object of the invention is achieved with a fluidized bed reactor comprising at least one granulation compartment with at least one air inlet and at least one air moving device, configured to move air through said at least one air inlet into said at least one granulation compartment, wherein said air is moved essentially by the action of said at least one air moving device downstream of said granulation compartment. To this end, the at least one air moving devices downstream of said at least one granulation compartment has a total capacity to generate a vacuum in the at least one granulation compartment, exceeding the total pressure drop between the air inlets and the downstream air moving devices. For example, the at least one air moving devices may be configured to create a vacuum of at least about 50 mbar, e.g., within the range of about 50 to about 70 mbar.

Where known systems use blowers to blow air into the granulation compartment, it was surprisingly found that a fluidized bed reactor which draws air by a downstream air moving device (e.g. an air pump, ventilator, or fan) consumes substantially less energy, since the fluidized bed reactor can now be designed for lower inlet temperatures of the fluidization air.

This is especially useful for the production of urea-based products as the process of making urea is an exothermal process, but the features of the fluidized bed reactor according to the invention and the method according to the invention are equally beneficial for the production of ammonium nitrate. During crystallization of the urea liquid, collected on the solid nuclei, heat is generated. Air, used for fluidization, removes excess heat from the fluidized bed. The required amount of fluidization air depends on the temperature of the air, entering the granulator compartment. The warmer the fluidization air is when entering the granulation compartment, the more fluidization air is required to remove excess heat from the granulation compartment. As a result, more air has to be cleaned in the scrubbers and more energy is consumed by the exhaust fans. Therefore, the temperature of the fluidization air should not be too high. If the temperature of the fluidization air is low, less air is required for cooling the fluidized bed. However, the inflow of fluidization air must not be too low, otherwise the bed of nuclei will not be sufficiently fluidized. Hence, the fluidized bed reactor should be designed in such a way that, on the one hand, the amount of fluidization air must be sufficient to achieve good fluidization and to cool the fluidized bed effectively, while, on the other hand, energy consumption for cleaning and discharging exhaust air should be minimized. Alternatively, the fluidization air may be cooled by air cooling equipment, but this setup requires extra energy to drive the air cooling equipment.

Air used for fluidization may, for example, be ambient air. The temperature of the ambient air may differ considerably. The fluidized bed reactor is therefore usually designed for use with air of summertime temperatures. With known fluidized bed reactors, these temperatures are increased with about 5 to 9° C., or even more, because of the heat, generated by the blowers, as these blowers, blowing the fluidization air into the granulation compartments, also generate heat. The generated heat is typically dependent on the efficiency of the used blower and on the pressure at the outlet of the blower. In practice, the generated heat is such that the passing air is heated by at least 5° C., normally at least 9° C., and sometimes 11° C. or more above ambient temperature.

As a result, known fluidized bed reactors are designed for use with relatively high temperatures of the fluidization air. This results in higher energy consumption by the blower, the scrubbers and the exhaust fans. Moreover, in winter, the ambient air should be pre-heated to bring it closer to the relatively high air temperature for which the reactor was designed.

With the fluidized bed reactor of the present invention, no upstream air moving devices need to be used at the fluidization air inlet, but the air is drawn into the granulation compartment by means of at least one downstream air moving device. This means that the fluidization air is not heated by any upstream blower and the reactor can be designed for lower inlet temperatures of the fluidization air. Less air needs to be consumed for cooling the fluidized bed and less air needs to be scrubbed and discharged. Moreover, lower pre-heating temperatures can be used in winter.

With the fluidized bed reactor of the present invention, using one or more downstream air moving devices to draw air into the reactor, automatically, an underpressure in the granulation compartments is achieved, while with the known fluidized bed reactors, an overpressure is automatically realized and extra measures need to be taken to realize a slight underpressure at the granulation compartment. An underpressure results in an improved evaporation in the granulation compartment.

According to one embodiment, a fluidized bed reactor according to the invention is provided, devoid of any air moving device which is configured to move air through said at least one air inlet into said granulation compartment and which is positioned upstream of the granulation compartment.

According to one embodiment, a fluidized bed reactor according to the invention is provided comprising at least one after-cooler, wherein the at least one air moving device is positioned downstream of the at least one after-cooler. As a result, the air entering the after-cooler is not heated by the air moving device motor, such that the air is already about 9 toll ° C. cooler when it enters the after-cooler. By eliminating the 9 to 11° C. extra heating of the fluidization air by the air moving device motor, the cooler can operate, e.g., with an ambient air temperature. This means a substantial improvement of the cooling capacity.

According to one embodiment, the fluidized bed reactor comprises at least one after-cooler positioned downstream from the at least one granulation compartment. The after-cooler(s) is generally part of the fluidized bed reactor and is also provided with a supply of fluidization air. In some embodiments, the fluidized bed reactor comprises at least two after-coolers. In some embodiments, the fluidized bed reactor comprises two or three after-coolers. The at least one air moving devices downstream of the after-cooler(s) may be configured to draw fluidization air also into the after-cooler, optionally into both the after-cooler and the granulation compartment.

According to one embodiment, the at least one after-cooler is integrated in the fluidized bed reactor as a set of at least two chambers subsequent to the granulation compartments.

According to one embodiment, the at least one granulation compartment and the at least one after-cooler are separated by one or more ducts or channels and are not present in a single unit.

According to another embodiment, at least one granulation compartment and at least one after-cooler compartment are integrated together in the same unit and are not separated by a duct or channel. In one embodiment, all of the granulation compartment(s) and after-cooler(s) are integrated together in a single unit, wherein the after-cooler(s) are positioned downstream from the granulation compartment(s). These embodiments provide for a more compact design and allows for a more efficient pressure drop over the integrated granulator/after-cooler compared to distinct units. It is surprising and unexpected that sufficient and acceptable cooling may be accomplished when the granulation compartment(s) and after-cooler(s) are combined together.

According to one embodiment, the granulation compartment can be, for example, a spouted bed or any other suitable type of fluidized bed. Combinations of different types can also be used. In some embodiments, the fluidized bed reactor comprises at least two granulation compartments. In some embodiments, the fluidized bed reactor comprises three or four granulation compartments.

According to one embodiment, the fluidized bed reactor may comprise at least one scrubber downstream of the at least one granulation compartment. In such a case, the at least one air moving device for drawing fluidization air into the granulation compartment may, for example, be positioned downstream of the at least one scrubber. The air moving device may, for example, comprise at least one exhaust fan, in particular an exhaust of the scrubber.

According to another embodiment, the fluidized bed reactor may comprise at least one scrubber downstream of the at least one after-cooler. In such a case, the at least one air moving device for drawing fluidization air into the granulation compartment may, for example, be positioned downstream of the at least one scrubber. The air moving device may, for example, comprise at least one exhaust fan, in particular an exhaust of the scrubber, in particular for discharging air.

A single scrubber can be used for scrubbing air from the at least one after-cooler and air from the at least one granulation compartment. Having a single scrubber allows for a more compact design and a more efficient pressure drop over the system compared to having multiple scrubbers.

An advantage of using an integrated granulator/after-cooler is that there may be only a single exhaust duct to a single scrubber. When there are separate exhaust streams from the granulator compared to the after-cooler, then the exhaust from the granulator tends to significantly dirtier with more dust or other particulate matter. If these two exhaust streams were to then separately be introduced into the same scrubber, then the scrubber is typically not as efficient when trying to clean two different exhaust streams with substantially different amounts of particulates. Instead, there can be a single exhaust stream from the after-cooler directly to the scrubber. While the total amount of particulate still needs to be effectively scrubbed, the scrubber only needs to manage one exhaust stream with a single concentration of particulate. This would also be achieved with multiple exhaust ducts from the after-cooler to the scrubber where each exhaust duct had the same concentration of particulate, however, this would be a less efficient than using a single exhaust duct.

Alternatively, a first scrubber with at least one downstream air moving devices can be used for the granulation compartments, while a second scrubber or set of scrubbers, with at least one downstream air moving devices can be used for the after-cooler.

The pressure drop over the scrubbers is preferably low. To this end, scrubbers may be used comprising vertical demisters.

Particularly low pressure drop can be obtained by using a serial arrangement of a first demister for coarse particles (typically having a pressure drop of less than about 2 mbar) and a second demister for finer particles, e.g., submicron particles. If the air between the demisters is cooled, condensation of moisture will enlarge the particles such that the second demister can also be of a low pressure drop type. A suitable configuration of scrubbers is, for example, disclosed in US patent application US 2015/0217221 (Green Granulation Technology, 2015), incorporated herein by reference in its entirety. Other configurations with or without scrubbers can also be used.

The invention also relates to a method for the production of granules, such as granules of urea or ammonium nitrate, using the fluidized bed reactor according to the invention, as disclosed above.

According to one embodiment, a method is provided for the production of granules using a fluidized bed reactor comprising at least one granulation compartment with at least one air inlets and at least one air moving device, configured to move air through said at least one air inlet into said at least one granulation compartment, wherein said air is moved essentially by the action of said at least one air moving device downstream of said granulation compartment, the method comprising: drawing air in the at least one granulation compartment through the at least one air inlet using the at least one air moving device; and fluidizing the bed of granules with said drawn in air.

According to one embodiment, the method is devoid of any air moving step by an air moving device which is configured to move air through said at least one air inlet into said granulation compartment and which is positioned upstream of the granulation compartment.

Fluidization air is sucked into the granulation compartment by the downstream air moving device, e.g., by creating a vacuum, exceeding the pressure drop between the at least one air inlet and the at least one air moving device. The underpressure may, for example, be at least about 50 mbar, e.g., in the range of about 50 to about 70 mbar.

The fluidized bed reactor can, for example, be configured such that the pressure drop between at least one air inlet and an air exhaust of between 10 and 100 mbar, preferably less than about 80 mbar. The pressure drop over the granulation compartment may, for example, be between 10 and 60 mbar, preferably less than about 50 mbar.

The temperature of the fluidization air entering the granulation compartment may, for example, be below 114° C., e.g., below 100° C., e.g., below 90° C. A spouted bed can for example be operated at or below 120° C.

According to one embodiment, the air drawn into the at least one granulation compartment is not preheated, either deliberately using pre-heating equipment, or as a side effect of the action of upstream equipment, such as a fan.

The granulation compartments may further comprise a plurality of sprayers, connected to a supply of a granulating liquid, such as an aqueous urea solution. The sprayers may, for example, be configured to spray the liquid in at least one spraying zones in the compartment next to at least one unsprayed zone. The sprayers can, for example, be atomizers or hydraulic sprayers, such as air-assisted hydraulic sprayers.

When the solution is sprayed into the granulator compartment, the solution may, for example, have a temperature substantially above the crystallization point. If the solution is a urea-based solution, the solution can, for example, be sprayed at a temperature of at least about 120° C., or at least about 130° C. or at least about 135° C. If the solution is an ammonium nitrate solution, the solution can, for example, be sprayed at a temperature of at least about 160° C., or at least about 170° C. or at least about 180° C. The solution can, for example, be sprayed under a hydrostatic pressure of 1.5 to 6 bar, e.g., 2 to 4 bar or other suitable pressures. The sprayed droplets can, for example, have an average droplet size of about 20 to 120 micrometer, e.g., about 30 to 60 micrometer.

For granulation of urea, highly concentrated solutions can be used, for example, with a urea content of at least 90 weight % by total weight of the urea solution, e.g., at least 95 weight %.

The water content of the urea solution is generally low, e.g., less than 5 weight %, by total weight of the urea solution, e.g., less than 3 weight %. If the water content is less than 2.5 weight %, the solution is often referred to as a urea melt.

The urea solution may further contain additives such as, for example, formaldehyde and/or a urea-formaldehyde condensation products as a granulating aid for slowing down crystallization of the urea and as an anti-caking agent, preventing agglomeration of the resultant granules. If for example 0.1 to 3 weight %, based on total the weight of the urea solution, of formaldehyde is added to the urea aqueous solution, atomized liquid droplets adhere better to the urea nuclei. Other suitable additives can also be used.

For the granulation of ammonium nitrate, $Mg(NO3)_2$ and aluminium sulphate, e.g., with NaOH, may be used as suitable additives.

The nuclei can be supplied to the fluidized bed reactor via at least one inlet at an inlet side of the fluidized bed reactor. The nuclei can either be supplied continuously or be supplied and processed per batch.

Before being submitted to the granulation process, the nuclei may have any suitable average particle size, generally about at least 0.2, or at least 0.5 mm, generally at most 6 mm.

The nuclei may have any suitable composition. In general, they will mainly comprise the same material as the crystallized granulating liquid, in particular crystallized urea, but is also possible to use nuclei of a different composition than the crystallized granulating liquid.

For granulating urea, the flow velocity of the fluidization air in the fluidized bed can, for example, be about 1 to 8 m/sec, e.g., at least about 2 and/or at most about 3 or 4 m/sec. For granulating ammonium nitrate, the flow velocity of the fluidization air in the fluidized bed can, for example, be about 1 to 8 m/sec, e.g., at least about 2 and/or at most about 3.5 or 4.5 m/sec.

For granulating urea, the temperature in the granulation compartments of the fluidized bed reactor can, for example, be between 90 and 120° C., e.g., between 100 and 106° C. For granulating ammonium nitrate, the temperature in the granulation compartments of the fluidized bed reactor can, for example, be between 110 and 140° C., e.g., between 125 and 130° C. Typically, the temperature in the first compartment will be lower due to the return flow of recycled material. This can be compensated by using a higher density of sprayers in the first compartment.

To reduce the pressure drop over the granulation bed, the granulation bed may, for example, have a bed level of 1.5 m or less, e.g., about 1 m or less. Lower bed levels may reduce circulation of the granules in the fluidized bed. A suitable manner to reduce the bed level while maintaining the required circulation of granules is to use a fluidized bed reactor comprising at least one compartment with a floor with air inlet openings and a plurality of sprayers for spraying a granulating liquid, the sprayers being configured to spray the liquid in spraying zones next to unsprayed zones of the fluidized bed. The alternating arrangement of sprayed zones and unsprayed zones intensifies the required circulation of the granules and increases the residence time. Examples of such fluidized bed reactors are disclosed in US 2015/0217248 (Green Granulation Technology, 2015), incorporated herein by reference in its entirety.

The processed granules are typically discharged via at least one outlet of the fluidized bed reactor, either continuously or per batch. The processed granules typically have an average particle size of about 2 to 4 mm, but can be made smaller or larger if so desired.

The water content of the granules can be kept well below 0.3 weight % by total weight of the granules, e.g., below 0.25 weight %.

Granules with a particle size below and/or above a given size limit, or agglomerates, can be separated from the outflow, e.g. by sieving. Optionally, the coarse particles and/or agglomerates can be crushed and recycled to the fluidized bed reactor, e.g., together with granules with a particle size considered to be too small and/or with material separated from air discharged from the fluidized bed reactor.

The fluidized bed reactor can have at least one granulator compartments in a serial and/or parallel arrangement. In a specific embodiment, the fluidized bed reactor has at least two, e.g., three or more serially arranged compartments.

The inlets for fluidization air may, for example, comprise inlets in floors of the granulator compartments. To this end, the floor can for example be a grid above an air supply.

Optionally, the fluidized bed reactor may comprise an after-cooler, such as a fluidized bed cooler receiving discharged granules from the fluidized bed reactor compartments. The after-cooler can for example be used to cool the granules to a temperature of about 40° C.

The method according to the invention is suitable for the production of granules for agricultural and non-agricultural application, in particular for the production of fertilizers, such as NP, NPK, calcium nitrate and ammonium nitrate-based fertilizers, as well as for the production of technical nitrates (explosives, etc.).

The method according to the invention is suitable for the production of ammonium nitrate-based granules, such as granules of ammonium nitrate and calcium nitrate. All references herein to ammonium nitrate can be considered to equivalently apply to ammonium-nitrate based particles unless the context necessarily implies that it is only referring to ammonium nitrate.

The method according to the invention is in particular suitable for the production of urea-based granules, such as granules of urea, urea ammonium nitrate, urea ammonium sulphate and urea doped with elemental sulphur. All references herein to urea can be considered to equivalently apply to urea based particles unless the context necessarily implies that the reference is only referring to urea.

An exemplary embodiment of a fluidized bed reactor according to the invention will be explained with reference to the accompanying drawings.

DETAILED DESCRIPTION OF THE ILLUSTRATIVE EMBODIMENT

Figure 1:
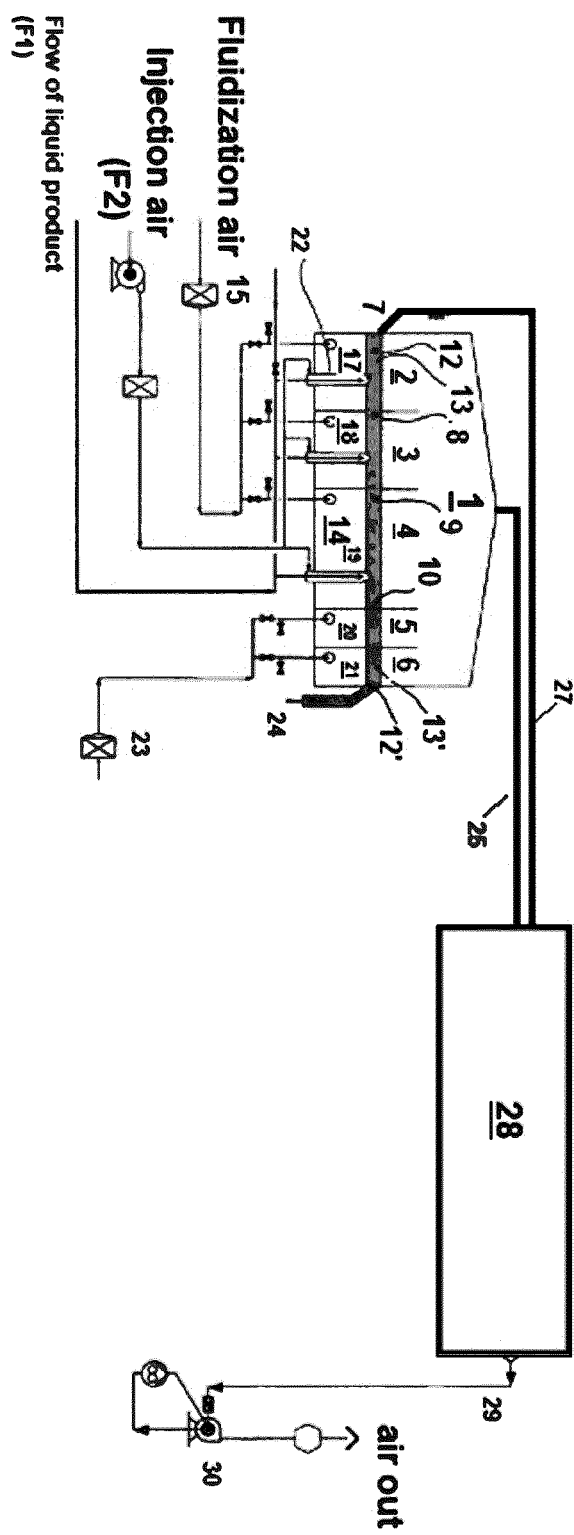
FIG. 1: shows an exemplary fluidized bed reactor setup according to the invention. This system has being realized by Yara International ASA in a semi-industrial pilot plant (SIPP) in Sluiskil, The Netherlands.

FIG. 1 shows an exemplary embodiment of a fluidized bed reactor 1 for the production of urea granules, or ammonium nitrate granules. The fluidized bed reactor 1 as shown in the figure comprises three granulation compartments 2, 3, 4 for granulation and two after-cooler compartments 5, 6 for subsequent cooling and drying the granules.

The first granulation compartment 2 of the fluidized bed reactor 1 comprises an inlet 7 for the supply of nuclei. Opposite to the inlet 7 is a first passage 8, leading to the second compartment 3. The second compartment 3 comprises a second passage 9 opposite to the first passage 8 and leading to the third compartment 4. The third compartment 4 comprises an outlet 10 opposite to the second passage 9. As a result, the nuclei can flow from the inlet 7 to the outlet 10 in a straight flow path.

The fluidized bed reactor 1 comprises a floor 12 made of a grid which supports a bed 13 of nuclei and which permits the passage of ambient fluidization air, supplied from a space 14 below the grid floor 12. Air inlets can for example be located at a side wall of the space 14 below the grid 12 and/or in the bottom of that space 14. In case the ambient air is relatively cold, for example during winter, the air can be preheated by heaters 15 in or upstream the space 14. The heated air fluidizes the bed 13 of nuclei.

The space 14 below the grid floor 12 is divided into compartments 17, 18, 19 in line with the compartments 2, 3, 4 above the grid floor 12. In each of the compartments 2, 3, 4 the grid floor 12 of the fluidized bed reactor 1 is provided with clusters of air-assisted sprayers 21 projecting above grid floor 12. The sprayers 22 are fed with a flow of liquid product (e.g. urea or ammonium nitrate) (F1) and a flow of pressurized air (F2), and spray an aqueous solution of urea or ammonium nitrate into the fluidized bed 13. In the granulator compartments 2, 3, 4, the water of the sprayed urea or ammonium nitrate solution evaporates and urea crystallizes on the nuclei, which grow to form granules.

The after-cooler is integrated into the fluidized bed reactor and comprises a fluidized bed cooler with a grid floor IT supporting a bed 13' of freshly produced granules and a space 20, 21 below the grid floor in line with the compartments 5 and 6 above the grid floor 12, also supplied with a heater 23 for the supply of air fluidizing and drying the bed 13'.

The after-cooler is provided with an outlet 24 for discharging the dried and cooled granules. Subsequently (not shown), undersized and oversized granules are separated from granules of the desired size, which are discharged for storage. The oversized granules can be crushed to finer particles, which can be recycled together with the undersized particles.

Air and air borne dust particles are discharged from the granulator compartments 2, 3, 4 and the after-cooler compartments 5 and 6 via one or more air ducts 25 to at least one scrubbers 28. In the schematic drawing of FIG. 1 a single scrubber is shown. Separate scrubbers may be used for treating air from the granulation compartments and air from the cooler, respectively. The scrubber may be a wet scrubber.

In the scrubber 28 the air is stripped. Separated dust particles can be recycled to the granulator compartments 2, 3, 4 via one or more ducts 27. Clean air leaves the scrubber 28 via a discharge duct 29 comprising an exhaust fan 30.

Figure 2:
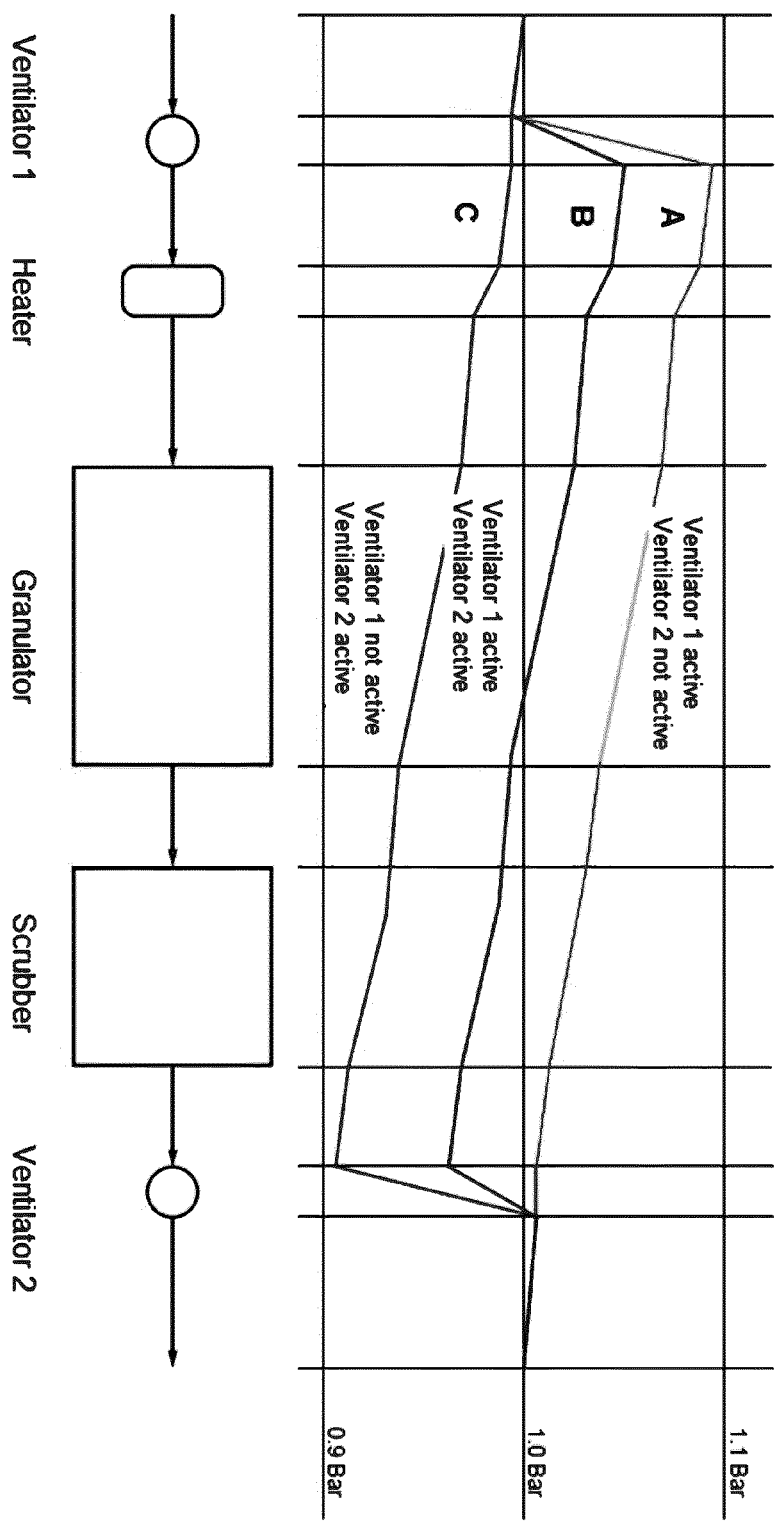
FIG. 2: shows a pressure graphs of the pressure in a fluidized bed reactor setup with two ventilators in different operational modes.

The exhaust fan 30 creates a pressure drop of about 10 and 100 mbar, e.g., about 75 mbar over the full flow path from the grid floor 12, 12' to the exhaust fan 30. As a result, fluidization air is sucked into the granulation compartments 2, 3, 4 via the grid floors 12 and 12'. No additional blowers are provided. The difference with known systems is shown in FIG. 2. FIG. 2 shows a pressure graphs of the pressure in a system, with either a downstream ventilator active (this application, C), an upstream ventilator active (A), or both an upstream ventilator and a downstream ventilator active (B) active such that a small underpressure (0.1 to 10 mbar) is formed in the fluidized bed reactor, as disclosed in U.S. Pat. No. 5,779,945 (DSM N.V., 1998) and EP 2253374 A1 (Stamicarbon, 2010). It is obvious that in the setup according to this invention, a larger underpressure is formed in the fluidized bed reactor, typically between 10 and 60 mbar.

EXAMPLE

A setup of the fluidized bed reactor according to the invention with three granulation compartments and integrated after-cooler was used for the continuous production of ammonium nitrate granules (see FIG. 1). The parameters of the experiment are summarized in the Tables 1 and 2 below. These are typical parameters for the operation of the fluidized bed reactor according to the invention.

TABLE 1

Average material balance

|  | Units | Start | After 7 hours | After 13.5 hours |
| --- | --- | --- | --- | --- |
| Outflow granulator | kg/h | 11,775 | 11,385 | 11,221 |
| Ready product after sieving | kg/h | 7,660 | 7,520 | 7,380 |
| Fines after sieving (returned to granulator) | kg/h | 2,782 | 2,388 | 2,784 |
| Coarse after sieving (to be crushed) | kg/h | 1,308 | 1,452 | 1,032 |
| Product after crushing | kg/h | 1,308 | 1,452 | 1,032 |
| Dust at exit granulator | kg/h | n.m. | n.m. | n.m. |
| Dust after ventilator | kg/h | n.m. | n.m. | n.m. |
| Agglomerates | kg/h | 25 | 25 | 25 | n.m. not measured

TABLE 2

Process parameters

Ammonium nitrate solution

| Temperature | 178 | ° C. |
| --- | --- | --- |
| Concentration | 97.6 | % |
| Flow rate | 5.5 | m³/h |

TABLE 2-continued

Process parameters

| Pre-pressure | 2.0 | ato[1] |
| --- | --- | --- |
| Per nebulizer 1st compartment Number of nebulizer: 4 | about 0.561 | m³/h |
| Per nebulizer 2th compartment Number of nebulizer: 5 | about 0.360 | m³/h |
| Per nebulizer 3th compartment Number of nebulizer: 5 | about 0.291 | m³/h |

Injection air

| Temperature | 142 | ° C. |
| --- | --- | --- |
| Pressure | 0.52 | ato |
| Flow rate | about 1,800 | Nm³/h |
| Per nebulizer 1st compartment Number of nebulizer: 4 | about 130 | Nm³/h |
| Per nebulizer 2th compartment Number of nebulizer: 5 | about 130 | Nm³/h |
| Per nebulizer 3th compartment Number of nebulizer: 5 | about 130 | Nm³/h |

Fluidization air

|  | Temperature (° C.) | Flow rate (Nm³/h) | Speed Nm/sec |
| --- | --- | --- | --- |
| 1st compartment | 78 | 2,471 | 2.02 |
| 2d compartment | 81 | 2,359 | 1.93 |
| 3d compartment | 79 | 2,836 | 2.92 |
| 4th compartment | 20 | 2,235 |  |
| 5th compartment | 18 | 2,299 |  |
| Suction | 113 | about 14,000 |  |

Fluidized bed

| Height | 685 | mmwk[2] |
| --- | --- | --- |
| Temperature 1st compartment | 127 | ° C. |
| Temperature 2d compartment | 127 | ° C. |
| Temperature 3d compartment | 130 | ° C. |
| Temperature 4th compartment | n.m. | ° C. |
| Temperature 5th compartment | 119 | ° C. |
| Temperature after granulator | 119 | ° C. |

Expansion room (space over the granulator compartments)

| Temperature 1st compartment | 127 | ° C. |
| --- | --- | --- |
| Temperature 2d compartment | 130 | ° C. |
| Temperature 3d compartment | 127 | ° C. |
| Temperature 4th + 5th compartment | n.m. | ° C. |
| Temperature top granulator | 113 | ° C. |

[1]atmospheres of overpressure over the standard atmospheric pressure; n ato = n + 1 atm (absolute) ≈ n + 1 bar
[2]mmwk = mm water column; 1 mmwk = 0.0981 mbar ≈ 0.1 mbar

RESERVATIONS

Although the subject matter has been described in language, specific to structural features and/or methodological acts, it is to be understood that the subject matter as defined in the appended claims is not necessarily limited to the specific features or acts described above as has been held by the courts. Rather, the specific features and acts described above are disclosed as example forms of implementing the claims. The claimed subject matter is not limited to implementations that solve any or all disadvantages noted in the background.

The invention claimed is:
1. A fluidized bed reactor comprising:
a) at least one granulation compartment with one or more air inlets;

b) at least one after-cooler compartment downstream of and integrated with the at least one granulation compartment;

c) a single scrubber downstream of the granulation compartment;

d) a single exhaust duct configured to provide a single exhaust stream from the at least one after-cooler compartment directly to the scrubber;

e) at least one air moving device downstream the scrubber;

wherein the granulation compartment is configured to draw air through said one or more air inlets into the granulation compartment; and, wherein the at least one air moving device has sufficient capacity to create a vacuum exceeding the total pressure drop between the air inlets and the air moving device.

2. The fluidized bed reactor according to claim 1, wherein the air moving device comprises one or more exhaust fans for discharging air.

3. The fluidized bed reactor according to claim 1, wherein the fluidized bed reactor comprises three granulation compartments.

4. The fluidized bed reactor according to claim 1, wherein the fluidized bed reactor comprises two after-cooler compartments.

5. A method for producing urea-based or ammonium nitrate-based granules using a fluidized bed reactor comprising at least one granulation compartment having one or more air inlets, at least one after-cooler compartment downstream of and integrated with the at least one granulation compartment and a bed of ammonium nitrate-based or urea-based granules, a single scrubber downstream of the granulation compartment, a single exhaust duct configured to provide a single exhaust stream from the at least one after-cooler compartment directly to the scrubber, and at least one air moving device downstream the scrubber; the method comprising: drawing air in the at least one granulation compartment through the one or more air inlets using the at least one air moving device; fluidizing the bed of granules with the drawn in air in the granulation compartment; spraying the granules with a granulating liquid; transferring the sprayed granules to the after-cooler; cooling the sprayed granules.

6. The method of claim 5, wherein drawing air in the at least one granulation compartment includes creating a pressure drop between the one or more air inlets and an air exhaust below 800 mm water column.

7. The method of claim 5, wherein the method further comprises:
stripping air in the scrubber thereby separating dust particles from stripped air; and,
recycling the dust particles to the at least one granulation compartment via one or more ducts.

8. The method according to claim 5, wherein the pressure drop over the granulation compartment is at most 500 mm water column.

9. The method according to claim 5, wherein drawing air in the at least one granulation compartment includes creating a pressure drop between the at least one air inlet and an air exhaust of between 10 and 100 mbar.

10. The method according to claim 9, wherein the pressure drop is between 10 and 80 mbar.

11. The method according to claim 5, wherein drawing air in the at least one granulation compartment includes creating a pressure drop over the granulation compartment of between 10 and 60 mbar.

12. The method according to claim 5, wherein the bed of granules includes urea-based granules.

13. The method according to claim 5, wherein the urea-based granules are selected from the list consisting of urea, urea ammonium nitrate, urea ammonium sulphate and urea doped with elemental sulphur.

14. The method according to claim 5, wherein the bed of granules include ammonium nitrate-based granules.

15. The method according to claim 14, wherein the ammonium nitrate-based granules are selected from the list consisting of ammonium nitrate and calcium nitrate.

16. The method according to claim 5, wherein drawing air in the at least one granulation compartment includes creating a pressure drop between the one or more air inlets and an air exhaust below 750 mm water column.

17. The method according to claim 5, wherein drawing air in the at least one granulation compartment includes creating a pressure drop between the at least one air inlet and an air exhaust of less than about 80 mbar.

18. The method according to claim 9, wherein the pressure drop is less than about 75 mbar.

19. The method according to claim 5, wherein drawing air in the at least one granulation compartment includes creating a pressure drop over the granulation compartment of less than about 50 mbar.

* * * * *